Figure 3:
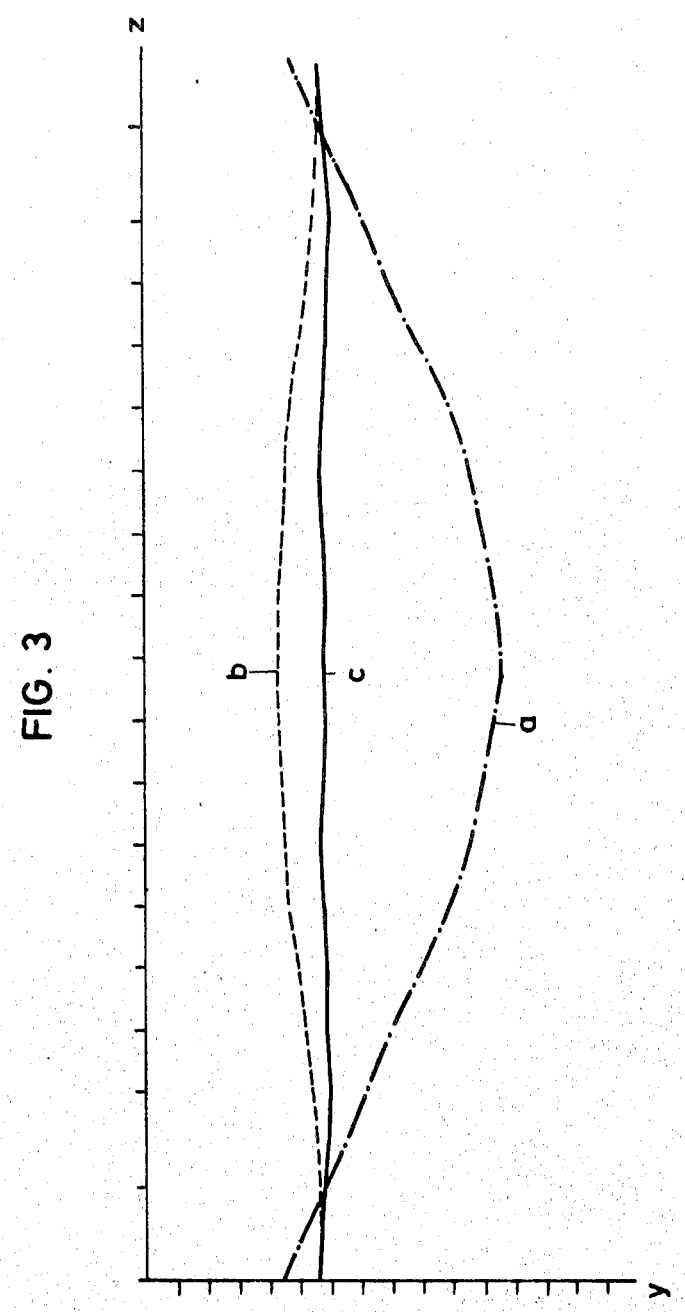

United States Patent [19]

Gressin

[11] 4,409,823
[45] Oct. 18, 1983

[54] APPARATUS FOR MEASURING AND RECORDING DEFLECTIONS

[75] Inventor: Jean-Claude Gressin, Herrenschwanden, Switzerland

[73] Assignee: Map SA, Bern, Switzerland

[21] Appl. No.: 162,264

[22] Filed: Jun. 23, 1980

[30] Foreign Application Priority Data

Jun. 21, 1979 [CH] Switzerland .......................... 5819/79

[51] Int. Cl.$^3$ .......................... E01C 23/01; G01L 5/12
[52] U.S. Cl. ...................................... 73/146; 33/1 PT
[58] Field of Search .......................... 73/146; 33/1 PT

[56] References Cited

U.S. PATENT DOCUMENTS

| 3,069,904 | 12/1962 | Henry | 73/146 |
|---|---|---|---|
| 3,353,404 | 11/1967 | Swift | 73/146 |
| 3,427,877 | 2/1969 | Swift et al. | 73/146 |
| 3,431,776 | 3/1969 | Hughes | 73/146 |
| 3,475,954 | 11/1969 | Cook | 73/146 |
| 3,481,183 | 12/1969 | Swift | 73/146 X |

FOREIGN PATENT DOCUMENTS

| 1955786 | 5/1971 | Fed. Rep. of Germany | 73/146 |
|---|---|---|---|
| 1552070 | 11/1968 | France | 73/146 |
| 568559 | 10/1975 | Switzerland | 73/146 |

OTHER PUBLICATIONS

Publication: "Road Deflection Measuring Apparatus Under . . . Loaded Axle", Lacroix Deflectographs, 20 AC 79 France, pp. 1-2, 1979.
Publ.: "The Lacroix-L.C.P.C.* Deflectograph", E. Prandi, pp. 1059-1068, (FIG. 4), 1967.

Primary Examiner—Daniel M. Yasich
Attorney, Agent, or Firm—Parkhurst & Oliff

[57] ABSTRACT

The apparatus comprises two runners which are situated in front of a crossbar and form the forward supports of a T-shaped beam. A central shank is pivotingly connected to a rocking-lever which rests on two other runners. Twin wheels of the rear axle of a load-bearing vehicle advance, while the apparatus continues to rest on its four runners, from a position in which the wheels are in line with the rear runner of the rocking-lever to a position in which they are in line with the front runner of the rocking-lever. Although both of these runners are successively situated in the zone where the road surface is deformed, their movements are complementary, so that the pivoting axis remains at the same level. The T-shaped beam thus forms a reliable reference for a horizontal plane relative to which measuring arms pivot, so that the movements of feelers aligned with the front runner of the rocking-lever can be recorded.

13 Claims, 3 Drawing Figures

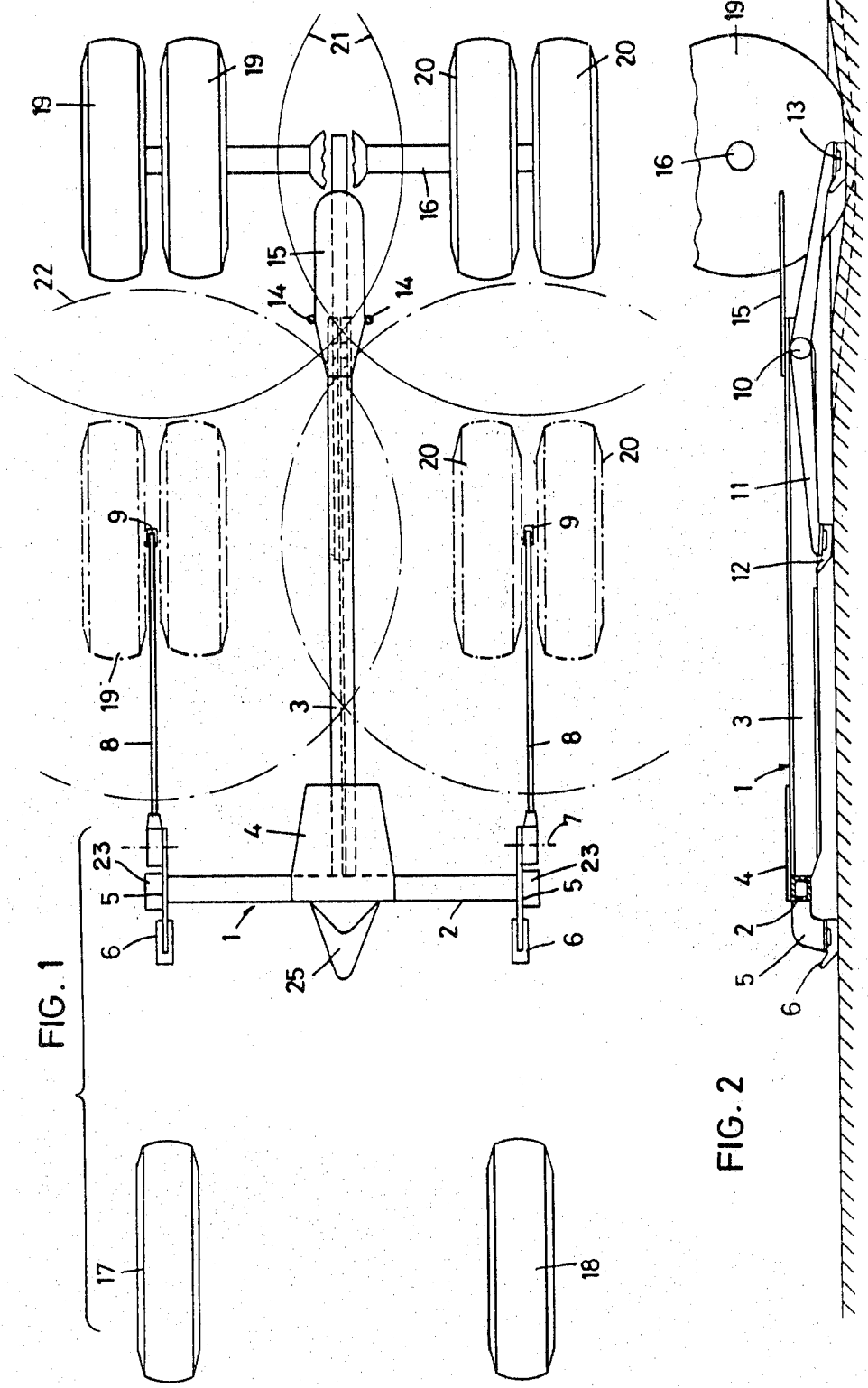

APPARATUS FOR MEASURING AND RECORDING DEFLECTIONS

This invention relates to measuring and recording apparatus, and particularly to apparatus for measuring and recording deflections of a flat horizontal surface acted upon by a concentrated load, of the type having a rigid beam resting on supports which in turn rest on the surface, one or more measuring arms equipped with feelers and pivoted on the beam about a transverse horizontal axis, and means for displacing and positioning the beam, these means being attachable to a load-bearing vehicle.

Apparatus of this type is used particularly for checking road surfaces. French Pat. No. 1,552,070 and Swiss Pat. No. 568,559 describe different designs of such apparatus. Thus, the Swiss patent relates to an improvement intended to enable the apparatus to measure deformations in very resistant road pavements, i.e., where the extent of deformation at the load point is relatively low, while the zone affected by the deformation extends over a relatively large distance from the load point.

Furthermore, German Disclosed application (DOS) No. 1,955,786 discloses a design intended to check unevenness in road surfaces, wherein a rigid beam is guided and supported on the roadway by rollers pivoting at the ends of rocking-levers which are in turn swivel-mounted at the ends of the beam. With this technique, deformations are measured continuously, but it is not possible to achieve the accuracy of measurement required nowadays for checking certain roads having very resistant pavement.

One of the factors which must be taken into account in adapting deflection-recorders to the measurement of very hard pavements is the influence the apparatus may have on the load-bearing vehicle to be used. It will obviously be preferable to use a load-bearing vehicle of standard size, e.g., one having a wheel-base no longer than 4.5 meters. If larger vehicles have to be used, difficulties are encoutered when measuring the deformation in curves, and furthermore the cost of the vehicle increases considerably.

It is an object of this invention to provide improved apparatus of the type initially described, which can be associated with a load-bearing vehicle of normal size and which makes it possible to carry out precise measurements on hard pavements.

To this end, in the apparatus according to the present invention, the supports comprise, firstly, two front supports integral with the beam and situated on the same straight line perpendicular to the longitudinal axis of the apparatus, and secondly, two rear supports situated at the ends of a rocking-lever, the latter being disposed along the longitudinal axis of the apparatus and pivotingly mounted halfway along its length on the rearward end of the beam.

A preferred embodiment of the invention will now be described in detail with reference to the accompanying drawings, in which:

FIG. 1 is a top plan view showing the apparatus disposed beneath the chassis of the load-bearing vehicle, FIG. 2 is an elevation of the apparatus, and FIG. 3 is an explanatory graph showing, on a comparative basis, the movements of the beam of the apparatus during the advance of the load-bearing vehicle in three different cases.

The general construction is illustrated in FIG. 1. A beam 1 is composed of a crossbar 2 and a longitudinal shank 3. These components may be made of metal sections, e.g., a rectangular section for crossbar 2, as may be seen in FIG. 2. Shank 3 is made integral with front crossbar 2 by means of a connecting plate 4, in front of which there is a coupler 25 for attachment to a positioning and displacement device and for pulling the measuring apparatus to a new measuring position beneath the vehicle (not shown). Any conventional positioning device known in this art, such as that shown in French Patent 1,552,080, is suitable.

Connected to each end of front crossbar 2 is a longitudinal supporting element 5, which may be a sectional beam. Element 5 extends forward and backward from crossbar 2. At its forward end, element 5 bears a support runner 6, while at its rearward end it bears a fixed element of a pivot joint 7 having a horizontal axis perpendicular to the longitudinal axis of the apparatus. The swivelling part of joint 7 is integral with the front end of a measuring arm 8, the rearward end of which bears a feeler 9. As can be seen in FIG. 1, the measuring arms extend substantially parallel to and are spaced from shank 3 of the beam. A measuring and recording instrument (as shown generally by numeral 23 in FIG. 1) will be mounted on supporting element 5. This instrument, of a type known per se, will continuously measure the angle formed by measuring arm 8 relative to the position of beam 1. A very high-precision instrument capable of measuring extremely small angles will be used. In order for the measurement to be reliable, beam 1 must naturally remain in a reference position throughout the measuring operation. As previously explained, the front end of beam 1 rests on the two support runners 6, and these supports must necessarily be situated in a zone which is not deformed during the measurement operation. This requirement is all the more easily met in that supports 6 are situated in front of crossbar 2 and, consequently, likewise in front of the pivoting axis of measuring arms 8. Thus, relatively short measuring arms may be used, e.g., of the same length as in prior art apparatus. Runners 6 are farther away from feeler 9 than in the prior art apparatus, where they have been situated in line with the pivoting axes.

In order to ensure reliability of the measurement, and thus the immobility of beam 1, shank 3 of beam 1 bears at its rearward end a pivot joint 10 supporting a rocking-lever 11. This lever, in the form of a likewise sectional bar, extends longitudinally beneath shank 3. If, for example, shank 3 is made of a T-section or an I-section, rocking-lever 11 may comprise two parallel longitudinal elements connected at their front and back ends by transverse plates. These elements embrace shank 3 of beam 1 and are mounted by means of bearings, which may be ball bearings on trunnions integral with beam 1. The two extremities of rocking-lever 11 end in runners 12 and 13, viz., a front runner and a rear runner.

FIG. 1 also shows two guide elements 14 forming part of the positioning and displacement device. They are normally fixed with respect to the chassis of the load-bearing vehicle and serve to guide the apparatus when it moves relative to the vehicle. Guide elements 14 cooperate with a rear plate 15 integral with shank 3 of beam 1.

Likewise shown in FIG. 1 is the rear axle 16 of the load-bearing vehicle, as well as the two front wheels 17 and 18 thereof. Rear axle 16 bears two pairs of twin wheels 19 and 20. Their position as shown in solid lines in FIG. 1 represents the starting position for a measuring operation. It will be seen that rear runner 13 of rocking-lever 11 is in line with axle 16. The rearward end of beam 1 is guided by elements 14, and feelers 9 are resting on the road on a transverse axis in line with front runners 12. This means, therefore, that the axis of joint 10 is farther toward the rear than the back ends of measuring arms 8 by a distance equal to half the length of rocking-lever 11. In the starting position, as may be seen in FIG. 2, rear runner 13, situated in line with axle 16, is resting in a zone where the road surface is subjected to maximum deformation. Runner 12, on the other hand, must be situated in a zone where the deformation is practically nil. The length of rocking-lever 11 will preferably be such that runner 12 is situated just at the edge of the deformed zone.

It will be understood that the zones of maximum deformation are between the two wheels of each pair of twin wheels 19 and 20. Hence these zones extend out from each end of axle 16, between the two wheels 20 and between the two wheels 19, since at these two locations the deformation is even greater than that to be observed at the center of axle 16.

The apparatus having been placed on the ground in the position shown in FIG. 1, the load-bearing vehicle is moved forward until wheels 19 and 20 reach the position shown in dot-dash lines in FIG. 1. It will be seen that in this position, the axis of axle 16 is in line with runner 12, and hence with feelers 9. The deformed zone, which was initially indicated by solid-line circles 21, has now been shifted forward and corresponds to the area enclosed within dot-dash circles 22. Feelers 9, which were completely outside the deformed zone to start with, are now at the centers of the deformation zones. The vertical displacement of beam 1 is virtually negligible. As will be readily perceived, runner 13 tends to rise, while runner 12 tends to drop. At the end of the measurement, runner 12 occupies a position which is exactly symmetrical to that which runner 13 occupied at the start of the measurement, and vice versa. For reasons of symmetry, therefore, the axis of joint 10 should not have moved, or will have moved only to a completely negligible extent.

In order to demonstrate that the measurement conditions are reliable with the arrangement described above, the graph of FIG. 3 reproduces recordings made with apparatus in actual practice. This graph comprises three curves plotted relative to two orthogonal axes, the y-axis representing the deflections measured from zero downward, and the z-axis representing the displacement of the maximum load point relative to the apparatus. Curve a is a comparison curve representing the vertical displacement of a point corresponding to the axis of joint 10 if beam 1, instead of resting on rocking-lever 11, were to rest on a single rear support disposed in line with the axis of joint 10. The apparatus being placed as in FIG. 1, the starting point, i.e., the left-hand end of curve a, corresponds to a minimum displacement showing that the axis of joint 10 is already in line with a slightly deformed region at the beginning of the measurement. As the vehicle advances, the axis of joint 10 would move downward to a point of maximum displacement at the moment when axle 16 is aligned with the axis of joint 10, after which the support point would rise until at the end of the measurement, it would be in the same position as at the beginning.

By way of comparison, curve b represents the case in which the length of a rocking-lever 11 is such that at the beginning of the measurement, front support 12 is clearly outside the deformed zone. It will be seen that under these conditions, during the start of movement of the load-bearing vehicle, runner 12 remains immobile since it is still resting on a non-deformed surface, whereas runner 13 rises gradually as the load point advances away from the location where runner 13 is resting on the ground. Hence the axis of joint 10 tends to rise until it reaches a point of minimum deformation, after which it drops again until by the end of the measuring operation, it has reached the same level as at the start.

Finally, curve c records the displacement of the pivoting axis of joint 10 when the length of rocking-lever 11 is adapted to the measuring conditions in such a way that runner 12 is situated substantially at the edge of the deformed zone at the beginning of the measurement. It is apparent that under these conditions, the pivoting axis of joint 10 undergoes virtually no change of level throughout the measuring operation. Thus, it may be said that the deformation curves recorded are absolutely reliable curves, whereas in the case of a rocking-lever of a length corresponding to curve b, for example, only the two extremes would be reliable points. In this case, the measurement would indicate the total deformation at the maximum load point, but it would not give with the same accuracy the whole sequence of deformations at the intervening points. Nevertheless, it has been found that single-point measurements of this sort yield useful and interesting results all the same.

Although runners 12 and 13 are integral with rocking-lever 11 in the embodiment described above, rocking-levers having adjustable runners might also be used, thus making it possible to regulate the operating conditions of the apparatus according to the quality of the road surface on which the measurements are taken.

What is claimed is:

1. Apparatus for static testing of a road surface, comprising:
   a rigid beam means having first and second ends and a longitudinal axis extending therebetween;
   support means coupled to the first end of said beam means for supporting said first end of said beam means on a road surface;
   at least one measuring arm having a first end pivotally coupled to said first end of said beam means for rotation about an axis, said measuring arm having a second end which comprises a feeler for resting on said road surface at a test location, said measuring arm being capable of rotational movement with respect to said rigid beam means upon deformation of said road surface at said test location; and
   a rocker lever means pivotally coupled to the second end of said beam means and extending substantially along said longitudinal axis, said lever means being coupled to pivotally support said beam means on a road surface at a point substantially in the middle of the length of said lever means and having a road contacting support disposed at each end of said lever means, said feeler and one of said road contacting supports of said rocker lever means being located between the first and second end of said beam means.

2. An apparatus for static testing of a road surface, comprising:
   a rigid beam means having a longitudinal axis and a first end, said beam means comprising a cross member coupled to said first end;

a plurality of support means coupled to said cross member for supporting said beam on a road surface, at least one support means being disposed on one side of said longitudinal axis and at least one support means being disposed on another side of said longitudinal axis;

a measuring arm having a first end pivotally coupled to said first end of said beam means around an axis substantially perpendicular to said longitudinal axis, said arm extending substantially parallel to and being spaced from said beam means, said measuring arm having a second end which comprises a feeler for resting on said road surface at a test location, said measuring arm being capable of rotational movement with respect to said beam means upon deformation of said road surface at said test location; and a rocker lever pivotally coupled to a second end of said beam means to extend substantially along said longitudinal axis and support said beam means on said road surface, said lever being pivoted at a point substantially in the middle of the length of said lever and having a road contacting support disposed at each end of said lever.

3. An apparatus as claimed in claim 1 or 2, wherein said support means and each of said supports are runners.

4. An apparatus as claimed in claim 1 or 2, said beam means comprising a rigid, horizontal cross member substantially perpendicular to the longitudinal axis of said rigid beam means, wherein said measuring arm and said support means are attached to said cross member.

5. An apparatus as claimed in claim 4, further comprising means for measuring and recording rotation of said measuring arm with respect to said rigid beam means, said means for measuring and recording being mounted on said beam means adjacent said measuring arm.

6. An apparatus as claimed in claim 4, wherein said cross member is disposed at one end of said rigid beam means and said rocker lever is pivoted substantially at the other end of said rigid beam means.

7. An apparatus as claimed in claim 4, wherein two measuring arms are provided and each measuring arm is disposed opposite to one of said support means with respect to said cross member and said measuring arms are disposed on the same side of said cross member as said rocker lever.

8. An apparatus as claimed in claim 7, wherein each of said measuring arms are dimensioned and positioned so as to be capable of fitting between one pair of twin wheels of a load bearing vehicle.

9. An apparatus as claimed in claim 7, further comprising two supporting elements, one attached to each end of said cross member, one measuring arm and one support means being attached to each of said supporting elements.

10. An apparatus as claimed in claim 7, wherein said support nearest said cross member is located on a straight line with said feelers which is perpendicular to said longitudinal axis.

11. Apparatus for static testing of a surface comprising:

means for forming a beam which extends along a longitudinal axis;

means coupled to said beam for supporting a first portion of said beam on a surface;

means coupled to said beam and extending into contact with said surface at a test location and movable with respect to said beam for detecting deformation of said surface of said test location; and means pivotally coupled to a second portion of said beam spaced from said first portion for supporting said beam on said surface and including a member having first and second ends which contact said surface, said member being pivotally coupled to said second portion at a point substantially equidistant from said first and second ends.

12. The apparatus of claim 11 wherein said means for detecting deformation includes at least one measuring arm having a first end pivotally coupled to said beam for rotation about an axis substantially perpendicular to said longitudinal axis, said arm extending substantially parallel to and being spaced from said beam and having a second end which includes a feeler for resting on said surface at said test location, said measuring arm being capable of rotational movement with respect to said beam upon deformation of said surface at said test location, and further wherein said member is a lever which extends substantially along said longitudinal axis.

13. The apparatus of claim 12 wherein said lever and measuring arm are constructed and arranged such that one end of said lever and the feeler of said at least one measuring arm both contact said surface along an axis which is transverse to said longitudinal axis.

* * * * *